Oct. 2, 1934.  E. V. FRANCIS  1,975,204
SYSTEM AND APPARATUS FOR HANDLING MATERIAL
Filed Oct. 24, 1930  3 Sheets-Sheet 1

INVENTOR
Earle V. Francis.

INVENTOR
Earle V. Francis.

Patented Oct. 2, 1934

1,975,204

UNITED STATES PATENT OFFICE 1,975,204

SYSTEM AND APPARATUS FOR HANDLING MATERIAL

Earle V. Francis, Columbus, Ohio, assignor to The Jeffrey Manufacturing Company, Columbus, Ohio, a corporation of Ohio Application October 24, 1930, Serial No. 490,979

13 Claims. (Cl. 214—2)

This invention relates to new and useful improvements in systems and apparatus for handling material such for instance as the lead oxides and sulphates usually employed in storage battery manufacture, the dusts and fumes of which are injurious to workmen.

In the manufacture of paste or active material for grids or plates of storage batteries, the handling and mixing of large quantities of oxides and other compounds are required and it is an important object of this invention to provide dust proof means for conveying these materials from the sources of supply to the mixing apparatus so that the dust and fumes from the material are prevented from escaping into the atmosphere about the workmen.

The manufacture of these ingredients also requires the compounding of the various materials by weight, to assure proper proportions and it is, therefore, another object of the invention to provide a weighing mechanism in the means for transferring the material from the supply to the mixers whereby this material will be weighed during its transit from the source of supply to the mixers.

A further object of the invention is to provide the material conveying means with an extensible spout for cooperation with a depository to guide material therein and to exclude dust and fumes from the surrounding atmosphere.

A still further object of the invention is to provide valve means in said conveying apparatus operable subsequent to the extension of said chute and prior to its retraction.

Another object of the invention is to provide a mobile transfer device adapted to convey material from a plurality of points of supply to a depository and having means to completely enclose the material while in transit.

Still another object of the invention is to provide means for feeding material to the transfer device under pressure and means operable by a predetermined amount of material in the transfer device to relieve said pressure for automatically cutting off the supply of material to the transfer device. Means are also provided to prevent pressure being exerted upon the material in the supply device until the transfer device has been properly placed in communication therewith.

Other objects and advantages of the invention will become apparent during the course of the following description.

In the accompanying drawings forming a part of the description and wherein like numerals are employed to designate like parts throughout the several views, Figure 1 is a fragmentary sectional view through the support showing a front elevation of the apparatus with parts broken away;

Figure 1:
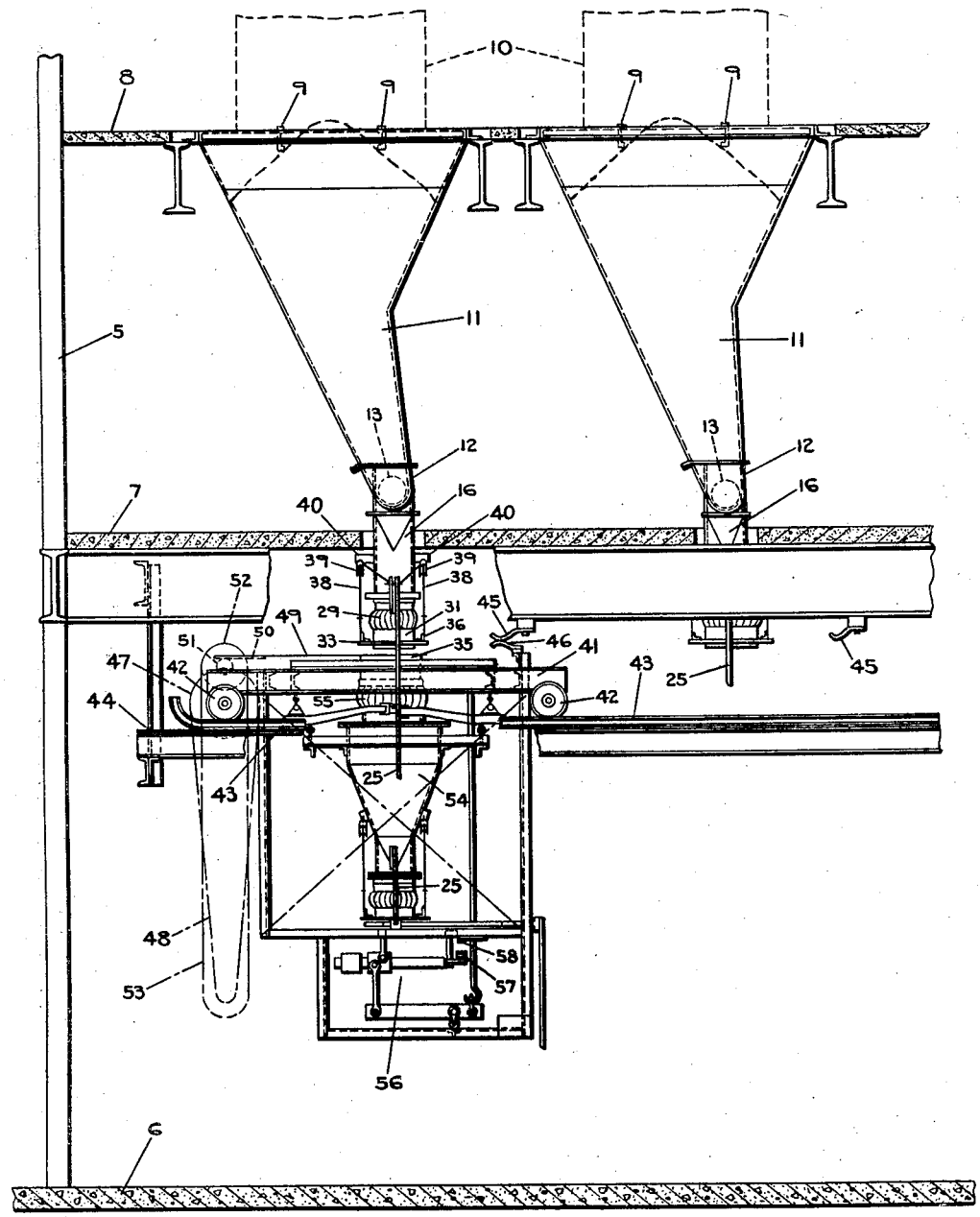
Figure 2:
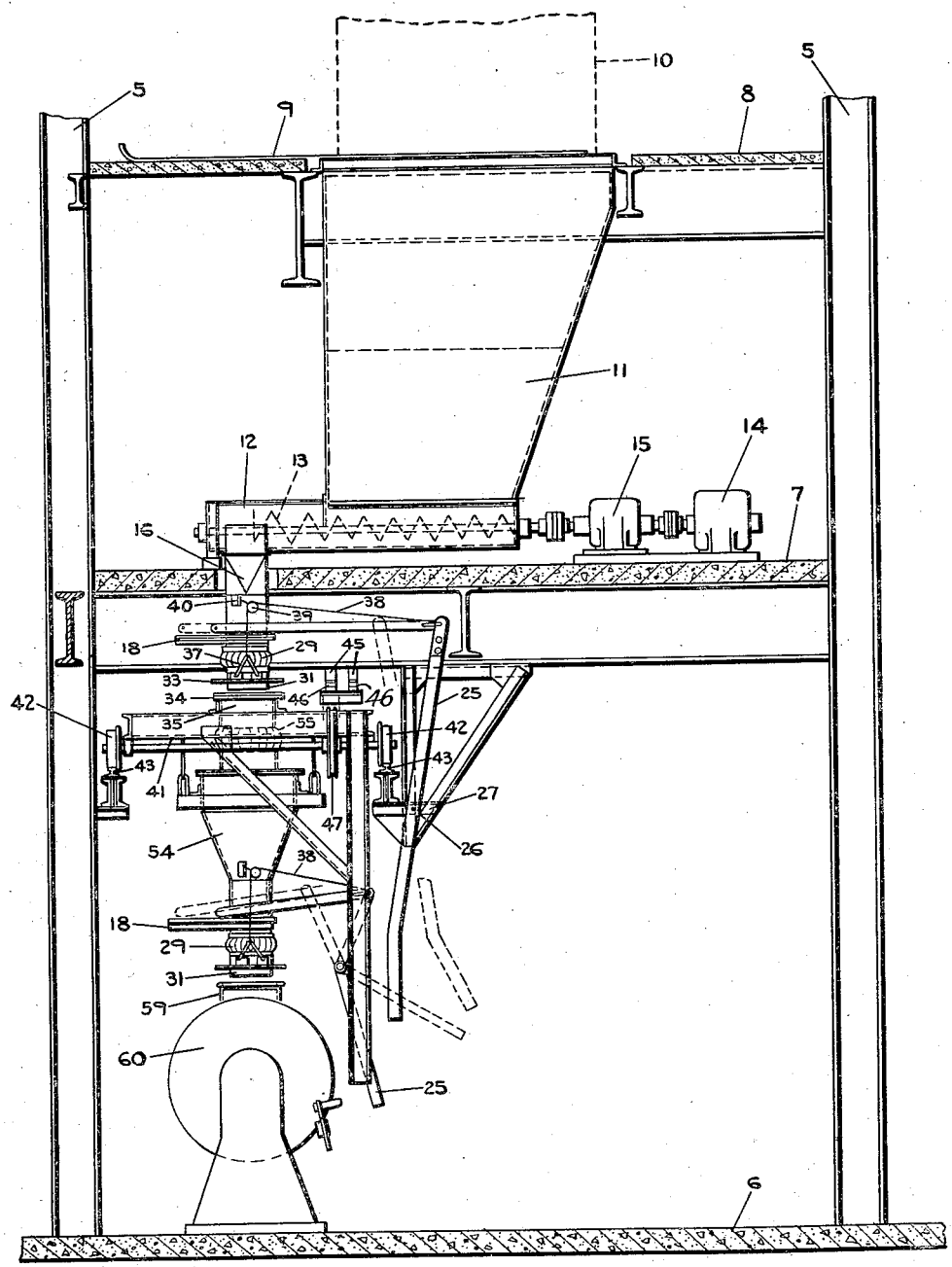
Figure 2 is a similar view taken at right angles to Figure 1 and showing an end elevation of the apparatus located with respect to a depository or mixing device.

Referring now more particularly to the drawings, the numeral 5 designates part of the framework of a building or other suitable supporting framework, having floors 6, 7, and 8 at various elevations. The upper floor or support 8 is provided with a plurality of parallel tracks 9, each leading into a dust proof housing 10, indicated in dotted lines, and described in my co-pending application, Ser. No. 416,188, filed December 23, 1929, for Barrell dumping mechanisms. Each of these dust proof housings 10 cover the upper end of a supply hopper 11 which depends from the support 8 to a point adjacent the next lower support 7 to terminate in a forwardly extending enclosed passageway 12. The barrel dumping mechanisms above mentioned are adapted to empty barrels of material into the hoppers 11, constituting stationary supply stations. Mounted in the forwardly extending pasageway 12 is a spiral conveyor 13 driven by an electric motor 14 positioned on the support 7 and transmitting its power to the conveyor shaft through reduction gearing 15. This motor is included in an electrical circuit and is automatically controlled by means to be hereinafter described.

Figure 3:
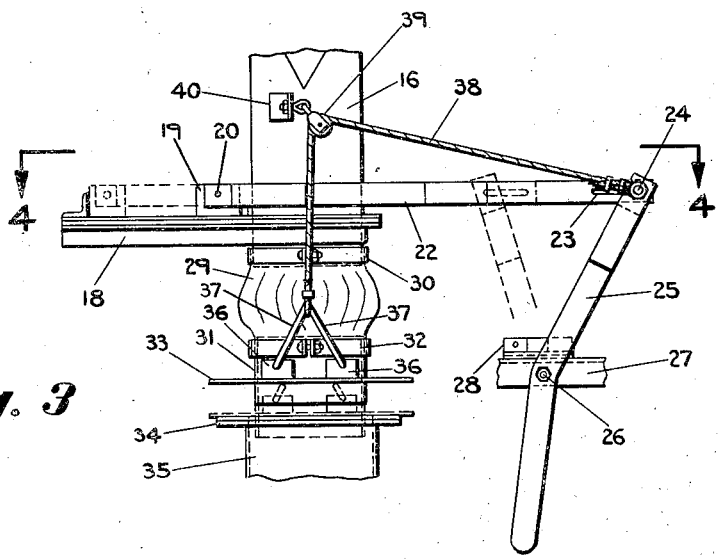
Figure 3 is an enlarged side elevation of one of the extensible spouts and valve mechanisms.
Figure 4:
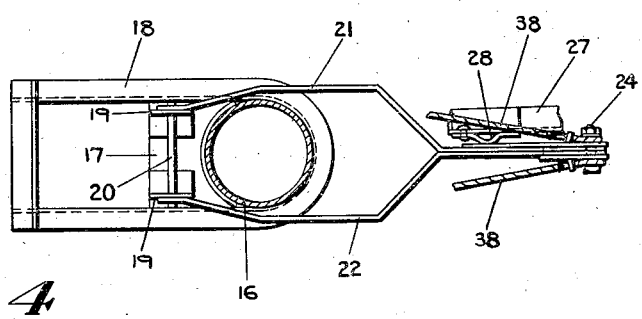
Figure 4 is the horizontal section taken on the line 4—4 of Figure 3.

The forward discharge end of the enclosed passageway 12 is provided with a depending spout 16 which projects down through an aperture in the support 7 to a point therebelow to receive material conveyed from the hopper 11 by the screw conveyor 13. A gate valve 17 is mounted to slide horizontally across the rigid spout 16 and is supported in a valve frame 18 secured to the spout as shown. This valve frame is provided with horizontal guide grooves for the mounting of the valve 17, which grooves are aligned with a slot in the chute to permit free movement of the gate valve to either completely close the passage through the spout 16 or to fully open the same. The valve plate 17 is provided with a pair of upstanding apertured ears 19 for the reception of a pivot pin 20, the ends of which receive the apertured forward ends of links 21 and 22. These links pass on opposite sides of the spout 16 to a point beyond, where they converge to meet for attachment. This end of the link 22 is extended as shown in Figure 3 and is provided with a horizontal longitudinally extending slot 23 in which slides a pin or bolt 24 carried by the upper end of an operating lever 25 fulcrumed as at 26 to framework 27 suspended from the floor 7. This pin and slot connection between the link 22 and lever 25 constitutes a lost motion device by which the operating lever 25 may move to a predetermined extent before actuating the valve moving links 21 and 22. In order to retain the operating lever 25 in any of its positions, a flat bowed spring 28 is secured to the framework 27 in the path of movement of that portion of the lever adjacent its fulcrum 26.

In order that the spout 16 may be rendered longitudinally extensible, a fabricated sleeve 29 is clamped around the lower end of the same by means of a clamp band 30. The lower end of this fabricated sleeve is clamped to a rigid tubular sleeve 31 by means of a clamp band 32. An annular horizontal flange 33 is carried by the sleeve 31 a substantial distance above its lower edge and constitutes a closure plate or cover adapted to rest upon a flange 34 of a spout 35 when the lower end of the sleeve 31 is projected into the same. This forms a dust proof closure between the spouts 16 and 35 when they are arranged in operative relationship to form a continuous conduit for the material being transferred. A pair of upstanding ears 36 rise from the closure plate 33 on each side of the extension sleeve or spout 31 to form the pivotal connection of a pair of bales 37. These bales on opposite sides of the spout are connected to the ends of cables 38 extended vertically and trained over pulleys 39 secured to the spout 16 by brackets 40. From these points, the cables 38 are directed toward the lever 25 to be anchored to the pin 24 thereof. As a consequence of this construction, movement of the lever 25 to the left of Figure 3 moves the pin 24 in slot 23 permitting the cable 38 to lower the extension spout 31 and permit extension of the fabricated sleeve 29 whereby the sleeve 31 will lower into the spout 35 until the closure plate 33 comes to rest on the flange 34 to form a dust proof joint. When the pin 24 reaches the end of the slot 23, it will move the links 21 and 22 to the left of the figure, thereby causing the gate valve 17 to open and allow material in the spout 16 to flow down into the spout 35.

Upon reverse movement of the operating lever 25, it will be appreciated that the gate valve 17 will close the spout 16 after which the extension spout 31 will be withdrawn from the spout 35 to its normal position to be retained there by reason of the spring 28, frictionally binding the lever 25 in position.

The spout 35 is carried by a carriage 41 of a weigh larry having wheels 42 movable upon a horizontal track 43 suitably suspended from the floor 7 by means of supports 44. The track 43 is arranged beneath the extension spouts of the feed hoppers 11 whereby the weigh larry may selectively receive material therefrom. Adjacent each extension spout, electrical contacts 45 are suspended from the framework to cooperate with electrical contacts 46 mounted on the weigh larry in establishing an electrical circuit with the motor 14 associated with the particular feed hopper from which the larry is to receive material.

Therefore, it will be evident that unless the spout 35 of the weigh larry is properly aligned with the spout 16 of the feed hopper, the force feed screw conveyor 13 cannot be operated by its motor 14.

Figure 5:
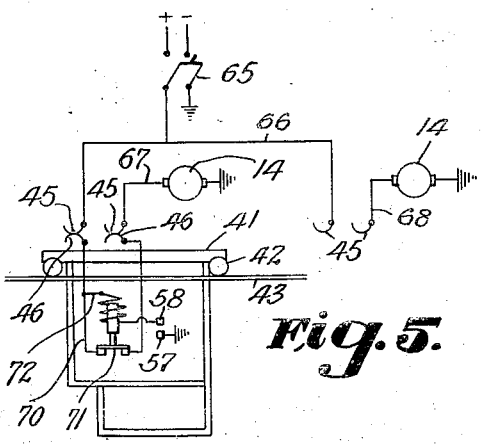
Figure 5 is a circuit diagram.

In Figure 5, I have shown an illustrative circuit diagram for the motors 14, two of the latter being shown. Referring to this diagram, the positive and negative leads may be brought in through a manually operable switch 65, the negative lead being grounded on the frame of the apparatus beyond the switch and the positive lead being connected to a conductor 66, which leads to one of each of the pairs of contacts 45. The others of these pairs of contacts are connected to the motors 14 through the conductors 67 and 68, as here shown, the other sides of the motors being grounded. The contacts 46 on the larry are connected by means of a conductor 70 on the larry provided with a break normally bridged by the bridging element 71 of an electro-magnetic circuit breaker. A line 72 leads from line 70 at the positive side of the break to contact 58, and has interposed therein the coil of the electromagnetic switch. The contact 57 is grounded on the metal frame of the larry, and is hence in connection with the negative lead. With switch 65 closed and the larry in the position shown, the motor 14 at the left will be operated. When the required weight has been deposited in the larry and contact 57 moves against contact 58, the coil of the electro-magnet switch is energized, thus opening the line 70 so that motor operation is arrested and feed stopped. Any other suitable circuit may, of course, be substituted.

In order to move the weigh larry from one feed hopper to another along the tracks 43, one of its wheel axles is provided with a sprocket 47 about which is hung an operating chain 48 by means of which the axle of the carriage 41 may be manually rotated to cause the desired movement of the larry. After the larry has received its charge of material from any of the feed hoppers, it is desirable to close the inlet end of the spout 35. This is accomplished by providing a sliding valve 49 in the spout 35 and actuating the same by means of a rack 50 controlled by a pinion 51 mounted in suitable bearings on the carriage of the larry. This pinion 51 is rotated in either direction by means of a sprocket wheel 52 having a sprocket chain 53 hung therefrom and extended to a point within easy reach of an operator standing on the floor 6.

A material receiving hopper 54 is yieldably slung from the carriage 41 and is flexibly connected to the spout 35 by means of a fabricated sleeve 55 which permits vertical movement of the hopper under the influence of the weight of material reposing therein. This hopper is connected in the well known way to a weighing scale mechanism 56 suspended from the carriage of the larry as shown and as this construction is well known in the art, a further description thereof is deemed unnecessary. This scale mechanism carries a movable contact 57 adapted to engage contact 58 when a predetermined quantity of material reposes in the hopper 54. The engagement of these electrical contacts 57 and 58 causes the electric motor 14 to be cut off, thereby stopping rotation of the screw conveyor 13 which relieves pressure on the material being fed through the spout 16.

The spout of the hopper 54 of the weigh larry is provided with the same valve mechanism and extensible spout shown in Figure 3 and since a detailed description of this has been given, further explanation of the same is unnecessary. The extension spout 31 of the hopper 54 is adapted to cooperate with a tubular inlet opening 59 of a mixing device indicated in general by the numeral 60. This mixing device is adapted to receive the properly weighed ingredients from the various feeding hoppers 11, conveyed by the weigh larry and to thoroughly mix the same for the formation of the battery paste hereinbefore mentioned.

Although the apparatus has been described in connection with the formation of active material for storage batteries, it is to be understood that the apparatus is adaptable for various other purposes. If desired, more than one mixing device can be positioned below the path of movement of the extension spout of the weigh larry and the latter operated to keep the various mixing devices constantly charged with the properly proportioned material. When the extension spout 31 of the hopper 54 is lowered into the inlet 59 of the mixing device, the closure plate 33 will come to rest thereon and form a dust proof conduit for the transmission of weighed material from the hopper 64 into the mixing device.

After material from one of the hoppers 11 is admitted into the hopper of the weigh larry, the valve 49 is closed, preventing fumes and dust from the material escaping to the atmosphere while the weigh larry is being moved to a point to align its extension spout 31 with the inlet of the depository. After the larry reaches this point, the operating handle 25 on the hopper 54 is actuated to first lower the extension spout 31 into the inlet 59 and thereafter open the valve 17 to permit material from the hopper to pass through the extension spout and into the mixing device.

It is to be understood that various changes in the construction and arrangement of the various parts hereinbefore described may be resorted to without departing from the scope of the appended claims.

I claim:

1. In a material filling spout, a slide valve controlling the passage of material therethrough, an extension spout adjustable longitudinally of the filling spout, an operating lever, a link connecting said lever and valve, said link having a slotted connection with said lever, and flexible means connecting said lever and extension.

2. In a system for handling material, a source of material, electrically driven means for feeding the material under pressure including an electric circuit, a stationary contact adjacent said feeding means, a weigh larry supplied by said feeding means and movable relative thereto, and a contact carried by said larry and adapted to engage said stationary contact to establish said circuit upon cooperative relation being established between said feeding means and larry.

3. In a system for handling material, a source of material, electrically driven means for feeding the material under pressure including an electric circuit, a stationary contact adjacent said feeding means, a weigh larry supplied by said means and movable relative thereto, a contact carried by said larry and adapted to engage said stationary contact to establish said circuit upon cooperative relation being established between said feeding means and larry, and means operated by a predetermined weight of material discharged into the larry for stopping said feeding means.

4. In a system for handling material, a feeding spout, a relatively movable receiving spout for receiving material therefrom, an electrically driven means for feeding material to said feeding spout and including an electrical circuit, a stationary contact in said circuit adjacent said feeding means, and a contact movable with said movable spout and adapted to engage said stationary contact to establish said circuit upon alignment of said spouts.

5. In combination with a filling spout, valve means controlling the passage of material therethrough, an extension spout adjustable longitudinally of the filling spout, and common operating means connected to said valve means and extension spout for actuating the same and including a lost motion connection between the operating means and valve means whereby upon actuating movement of the operating means the valve means remains at rest until the extension spout reaches its extended position.

6. In combination with a filling spout supported in downwardly projecting position, a horizontally disposed slide valve for controlling the passage of material therethrough, an extension spout adjustable longitudinally of the filling spout, a lever having a path of swing in the sliding direction of said valve, lost motion connecting means between the lever and slide, and flexible means connecting the lever and extension spout and suspending the latter.

7. In a system for handling material, a weigh larry, a hopper on said larry vertically movable relative to the larry, scale mechanism actuatable by the hopper, a filling spout fixedly supported by the larry above the hopper, and extensible and contractible tubular means forming a dust proof connection between the spout and hopper in all relations of the latter to the former.

8. In a system for handling material, a plurality of bins having downwardly extending discharge spouts, means associated with each of said bins for effecting discharge therefrom, each of said means including a separate electric motor for each bin, a track extending beneath said spouts, a larry movable on said track to take a position beneath a selected spout, and a switch automatically closed as the larry comes into receiving position below a selected spout and remaining closed only while the larry is at rest to complete a circuit to the motor associated with the bin with which the spout is in connection, said discharge means being continuously operative while said circuit is closed.

9. In a system for handling materials to be mixed, a plurality of bins containing the materials, a weigh larry adapted to move to a receiving position relative to any one of the bins, weighing means on the larry settable for various totals, discharge means for each bin, and means automatically operative to cut off said discharge means as the required amount of material, as indicated by the setting of the weighing means, is cumulatively received from each bin.

10. In a system for handling material, a series of material delivery stations, each of said stations including electrically operated positive discharge mechanisms, a track extending along said stations, a larry movable along said track into receiving position relative to said stations selectively, and a switch automatically closed as the larry comes into receiving position at a selected station and remaining closed only while the larry is at rest to complete a circuit to the electrically operated positive discharge mechanism associated with the selected station, said last named mechanism being continuously operative to effect discharge to the larry while said circuit is closed.

11. In a system for handling material, a series of material delivery stations, each of said stations including a separate electric motor operable to effect material delivery, a track extending along said stations, a larry movable along said track into receiving position relative to said stations selectively, and a switch automatically closed as the larry comes into receiving position at a selected station and remaining closed only while the larry is at rest to complete a circuit to the motor associated with the selected station, said last named motor being continuously operative to effect material delivery to the larry while said circuit is closed.

12. In a system for handling material to be mixed, a plurality of bins containing the materials, discharge means for each bin, a track extending in proximity to said discharge means, a weigh larry movable along said track into receiving position relative to said discharge means respectively, weighing means on the larry settable for various totals, and means automatically operative to cut off said discharge means as the required amount of material, as indicated by the setting of the weighing means, is cumulatively received from each bin.

13. In a system for handling material a series of material delivery stations, each of said stations including electrically operated discharge apparatus, a track extending along said stations, a weighing larry movable along said track into receiving position relatively to said stations respectively, a switch automatically closed as the larry comes into receiving position at a selected station and remaining closed only while the larry is at rest to complete a circuit to the electrically operated discharge apparatus, said last named apparatus being continuously operative to effect discharge to the larry while said circuit is closed, weighing means on the larry settable for various totals, and means automatically operative to break said circuit as the required amount of material, as indicated by the setting of the weighing means, is cumulatively received from each bin.

EARLE V. FRANCIS.